Patented Feb. 4, 1936

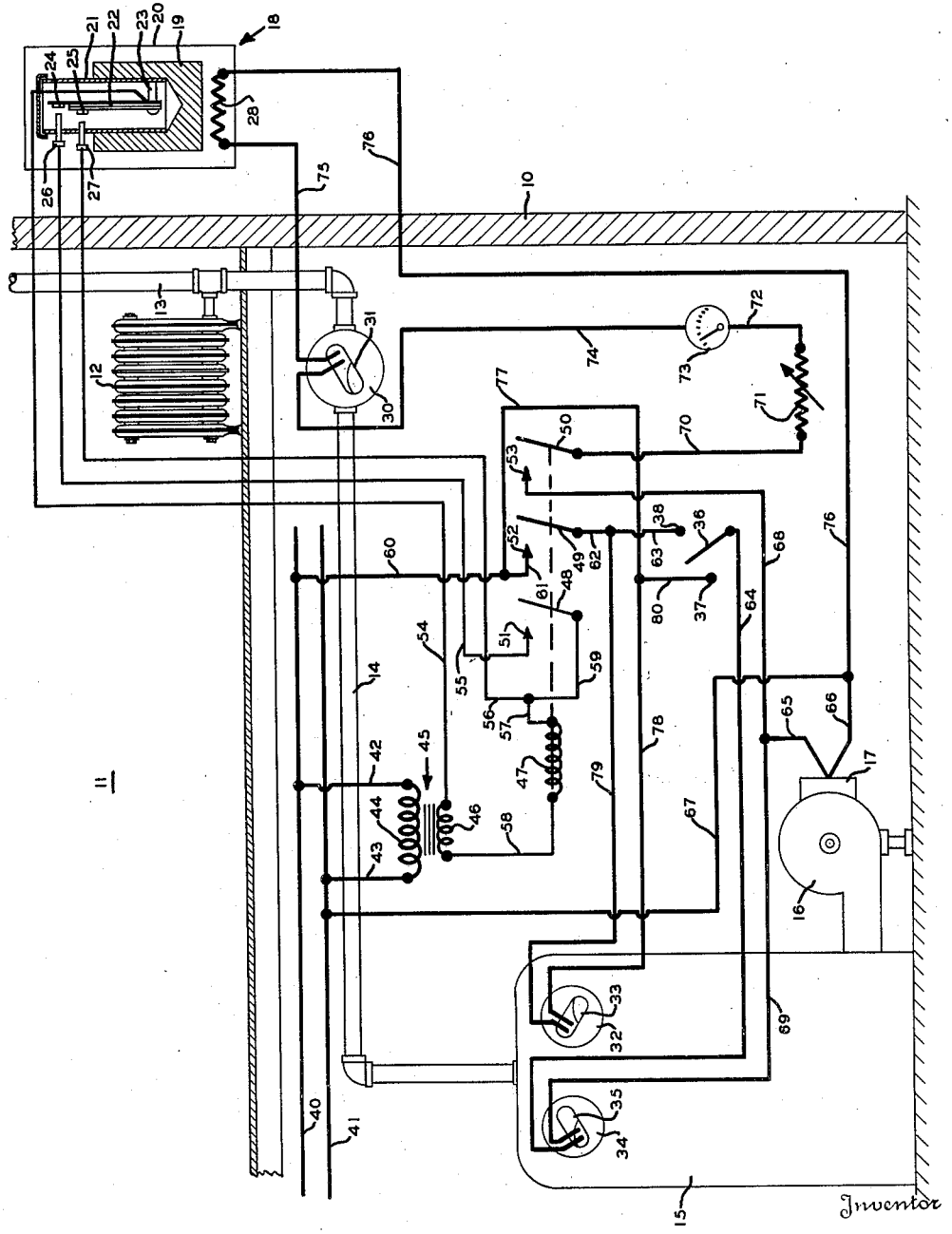

2,029,513

UNITED STATES PATENT OFFICE 2,029,513

TEMPERATURE CONTROL SYSTEM

Daniel G. Taylor, Minneapolis, Minn., assignor to Minneapolis-Honeywell Regulator Company, Minneapolis, Minn., a corporation of Delaware Application April 25, 1935, Serial No. 18,168

13 Claims. (Cl. 236—91)

REISSUED
NOV 5 1940

This invention relates to temperature control systems and particularly to that type of system disclosed in my copending application S. N. 512,887, filed February 2, 1931.

This system disclosed in the above identified application is directed to the maintenance of a normal temperature condition within a building in response to outside atmospheric conditions including temperature, wind and solar radiation. The system comprises a heating means for a building and an outdoor controller responsive to atmospheric conditions. The outdoor controller includes a thermostatic element and heating means. The heating means of the building and of the outdoor controller are under the control of the thermostatic means. Upon a call for heat by the thermostatic means, both heating means are placed in operation and when the temperature within the controller reaches a predetermined value, both heating means are placed out of operation. The heating means of the building and the controller are related to each other in accordance with the heat losses from the building and the controller so that by maintaining a predetermined temperature within the controller a predetermined temperature is maintained within the building.

The success of such a system depends upon the fact that proportionate amounts of heat are placed in the building and in the outdoor controller. Such a system works efficiently and to good advantage where an unlimited supply of heating medium is available whether it be from a central heating system or from a boiler which is maintained in a heated condition at all times. However, where the outdoor controller controls the operation of a boiler by means of an oil burner, a stoker or a gas burner, some time must elapse between the time the heating equipment is placed in operation and the time when steam is actually supplied to the radiators in the building. During this time, heat is being supplied to the outdoor controller and it is readily seen that when this is the state of affairs more heat is supplied to the outdoor controller in proportion to the heat supplied to the building. This causes a break down of the above ratio with a consequent inadequate heating of the building.

It is therefore an object of this invention to remedy this difficulty whereby the above ratio may be maintained and the building properly heated.

More specifically, it is an object of this invention to provide means for preventing energization of the heating means for the outdoor controller until heat is actually delivered to the building.

Still more specifically, it is an object of this invention to provide means for preventing energization of the controller heating means until steam is actually being supplied to the heat exchanger means in the building.

Another object is to provide a condition responsive means for maintaining the temperature of the water in the boiler at a predetermined minimum value, to reduce the time lag between the time of calling for heat by the outdoor controller and the time at which heat is actually delivered to the building.

Still another object is to provide means for preventing overheating of the boiler in the above type of temperature changing system.

Other objects and advantages will become apparent to those skilled in the art by reference to the accompanying specification, claims and drawing in which, drawing, there is diagrammatically shown the preferred form of my invention.

A building is diagrammatically shown having a side wall 10 and spaces to be heated 11. In one of the spaces to be heated 11 is shown a radiator 12 which receives its supply of heating fluid from a riser 13 which is in turn connected to a header 14 leading from a boiler 15. The boiler 15 is fired by means of an oil burner 16 having a control box 17 containing the usual safety switches and other mechanism relation thereto. Upon operation of the oil burner 16, steam is generated in the boiler 15 and delivered through the headers 14 and risers 13 to the various radiators 12 located in the spaces to be heated.

Located outside of the building and responsive to atmospheric conditions such as temperature, wind and solar radiation is an outdoor controller 18. The controller 18 comprises a metallic block 19 which is enclosed in a weather-tight housing 20. The metallic block 19 is hollowed out to receive a casing 21 which in turn contains a bi-metallic member 22 mounted on a post 23. The bimetallic member responds to the temperature of the metallic block 19. The bimetallic member carries contacts 24 and 25 which are adapted to sequentially engage stationary contacts 26 and 27. Contacts 26 and 27 are made adjustable so that the proper operating differentials may be maintained. The block 19 is heated by means of a heater 28 at predetermined times in a manner to be pointed out more specifically hereafter and cooled by outdoor atmospheric conditions.

A condition responsive device 30 responds to the condition of the building heating system. It may comprise either a pressure or temperature responsive device for operating a mercury switch 31. Such a structure is old in the art and a further detailed description thereof is not considered necessary. The mercury switch 31 is maintained in an open position until steam passes through the header 14 at which time the mercury switch 31 will be shifted to a closed position either by the temperature of the steam or by the pressure of the steam. Preferably, the condition responsive device 30 is located as far away from the boiler as is possible so that it will respond to the existence of steam just as the steam is about to enter the radiators 12.

Located on the boiler 15 is a low limit temperature controller 32 responsive to the temperature of the boiler water to operate a mercury switch 33. The mercury switch 33 is maintained in a closed position when the temperature of the boiler water is below a predetermined minimum and when the temperature of the water is above this predetermined minimum, the mercury switch 33 is tilted to circuit opened position. Also located on the boiler 15 is a high limit temperature or pressure controller 34 for operating a mercury switch 35. When the temperature or pressure in the boiler 15 is below a predetermined maximum value, the switch 35 is maintained in a circuit closed position but when the pressure or temperature becomes abnormally high, the mercury switch 35 is tilted to a circuit open position.

Located at some convenient point in the basement of the building is a basement switch 36 adapted to alternately engage an "on" contact 37 or an "automatic" contact 38.

Line wires 40 and 41 lead from some source of power, not shown. Wires 42 and 43 connect a primary 44 of a step-down transformer 45 across the line wires 40 and 41, respectively. The step-down transformer 45 has a secondary 46.

A relay coil is designated at 47 and operates switch arms 48, 49 and 50. Upon energization of the relay 47, the switch arms 48, 49 and 50 are brought into engagement with contacts 51, 52 and 53, respectively, and upon deenergization of the relay coil 47, the switch arms are moved out of engagement with the contacts by means of springs, gravity or other means, not shown. One end of the secondary 46 is connected by means of a wire 54 to the post 23 supporting the bi-metallic member 22 in the outdoor controller 18. The contact 26 of the outdoor controller is connected by means of a wire 55 to the contact 51 of the relay swtich. The contact 27 of the outside controller is connected by means of a wire 56 and a wire 57 to one end of the relay coil 47. The other end of the relay coil 47 is connected by means of a wire 58 to the other end of the secondary 46 of the step-down transformer 45. The switch arm 48 is connected by means of a wire 59 to the junction of wires 56 and 57.

When the temperature of the block 19 decreases to a predetermined value, contact 24 is moved into engagement with contact 26 and upon a further decrease in temperature, the contact 25 moves into engagement with contact 27 to complete a circuit from the secondary 46 of the step-down transformer 45 through wire 54, bi-metallic element 22, contacts 25 and 27, wire 56, wire 57, relay coil 47 and wire 58 back to the secondary 46. Completion of this circuit causes energization of the relay coil 47 to move the switch arms 48, 49 and 50 into engagement with the contacts 51, 52 and 53. Upon pulling in of the relay, a second or holding circuit is completed from the secondary 46 of the step-down transformer 45 through wire 54, bimetallic element 22, contacts 24 and 26, wire 55, contact 51, switch arm 48, wires 59 and 57, relay coil 47 and wire 58 back to the secondary 46. This holding circuit will remain energized until an increase in temperature of the block 19 causes the contact 24 to disengage the contact 26 whereupon the relay will fall out.

The line wire 40 is connected by means of wires 60 and 61 to the contact 52. The switch arm 49 is connected by means of wires 62 and 63 to the "automatic" contact 38. The switch arm 36 is in turn connected by means of a wire 64 to one electrode of the high limit mercury switch 35. The other electrode thereof is connected by means of wires 69 and 65 to the control box 17 of the oil burner 16 and the control box 17 is in turn connected by means of wires 66 and 67 to the line wire 41. Upon energization of the relay in the above described manner, switch arm 49 is brought into engagement with the contact 52 to complete a circuit from the line wire 40 through wires 60 and 61, contact 52, switch arm 49, wires 62 and 63, "automatic" contact 38, switch arm 36, wire 64, mercury switch 35, wires 69 and 65, oil burner 16 and wires 66 and 67 back to the line wire 41. The completion of this circuit causes energization of the oil burner 16 with consequent generation of steam within the boiler 15 and delivery of steam to the radiators 12 in the spaces to be heated.

Contact 53 is connected by means of a wire 68 to the junction of wires 65 and 69. The switch arm 50 is connected by means of a wire 70 to a variable resistance 71 which is in turn connected by means of a wire 72 to an ammeter 73. The ammeter 73 is connected by means of a wire 74 to one electrode of the mercury switch 31 and the other electrode of the mercury switch 31 is connected by means of wire 75 to the heater 28. The heater 28 is in turn connected by means of a wire 76 to the junction of wires 66 and 67. Upon energization of the relay coil 47 in the above described manner, switch arms 49 and 50 are moved into engagement with the contacts 52 and 53 to complete a circuit from line wire 40, through wires 60 and 61, contact 52, switch arm 49, wires 62 and 63, "automatic" contact 38, switch arm 36, wire 64, mercury switch 35, wires 69 and 68, contact 53, switch arm 50, wire 70, variable resistance 71, wire 72, ammeter 73, wire 74, mercury switch 31, wire 75, heater 28 and wires 76 and 67 back to the line wire 41. Upon completion of this circuit, the heater 28 is placed in operation to cause heating of the metallic block 19. The amount of heat delivered to the heater 28 may be determined and visually indicated by means of the variable resistance 71 and ammeter 73 to place the correct proportion of heat into the outdoor controller with respect to the heat placed in the building in order to maintain an efficient and satisfactory operation of the heating system.

Due to the fact that the mercury switch 31 responsive to the temperature or pressure within the header 14 is in series with the heater 28, the heater 28 cannot be energized until steam has actually been generated in the boiler 15 and delivered to the radiators 12 in the spaces to be heated 11. In this manner, the proportionate amounts of heat delivered to the building and to the outdoor controller may be maintained regardless of the time lag that must necessarily exist between the energization of the oil burner 16 and the delivery of heat to the spaces to be heated.

Wires 77 and 78 are connected between the junction of wires 60 and 61 and one electrode of the mercury switch 33 of the low limit controller 32. The other electrode of the mercury switch 33 is connected by means of a wire 79 to the junction of wires 62 and 63. When the temperature of the water within the boiler 15 falls below a predetermined value, the mercury switch 33 is tilted to closed position to complete a circuit from the line wire 40 through wires 60, 77 and 78, mercury switch 33, wires 79 and 63, "automatic" contact 38, switch arm 36, wire 64, mercury switch 35, wire 69, wire 65, oil burner 16, wire 66 and wire 67 back to the line wire 41 to cause energization of the oil burner 16 regardless of whether the relay is opened or closed. In this manner, the temperature of the boiler water is maintained at a temperature just below the steaming point whereby the time lag between the time that the oil burner 16 is normally placed in operation by the closing of the relay and the time that steam is delivered to the radiators 12 in the spaces to be heated is materially reduced. This low limit function of the mercury switch 33 smooths out the curve of the heating system and prevents "under-shooting" of the system.

The "on" contact 37 is connected by means of a wire 80 to the junction of wires 77 and 78 and when the switch arm 36 is moved into engagement with the "on" contact 37, the oil burner 16 is placed in operation by means of a circuit from the line wire 40 through wires 60, 77 and 80, "on" contact 37, switch arm 36, wire 64, mercury switch 35, wire 69, wire 65, oil burner 16 and wires 66 and 67 back to the line wire 41. In this manner, the oil burner 16 may be manually controlled irrespective of the other controlling circuits.

Since the mercury switch 35 of the high limit controller 34 is in series with both the oil burner 16 and the heater 28 of the outdoor controller 18, abnormally high boiler conditions will prevent operation of the oil burner 16 and the heater 28.

From the above it is seen that when the temperature of the block 19 of the outdoor controller 18 decreases to a predetermined value, the relay coil 47 is energized to close the relay switches to complete circuits for energizing the oil burner and the heater 28. The oil burner is placed in operation to generate steam and deliver steam to the radiators 12 to heat the building but the heating element 28 is prevented from being energized by the mercury switch 31 operated by the temperature or pressure controller 30 until steam has been generated and is actually being delivered to the radiators 12 in the building. By reason of this construction, the proper ratio between the heat losses from the building and the controller and the heat input to the building and the controller may be maintained regardless of the time lag required for steaming the boiler. Also, it is seen that I have provided a means for maintaining the boiler water temperature above a predetermined minimum whereby the time lag between the firing of the boiler and the delivery of steam to the building is materially reduced whereby "under-shooting" of the heating system is materially reduced.

Although I have disclosed one specific form of my invention for purposes of illustration, I do not wish to be limited thereby but intend that my invention shall be determined by the scope of the appended claims and the prior art.

I claim as my invention:

1. In a system of the class described, temperature changing means for a building, a controller responsive to outside atmospheric conditions, temperature changing means for said controller, means responsive to the temperature of said controller for energizing both of said temperature changing means, and means to prevent energization of said controller temperature changing means until said building temperature changing means begins to affect the temperature in the building.

2. In a system of the class described, temperature changing means for a building, a controller responsive to outside atmospheric conditions, temperature changing means for said controller, means responsive to the temperature of said controller for energizing both of said temperature changing means, and means responsive to the condition of the building temperature changing means to prevent energization of the controller temperature changing means until the building temperature changing means is about to affect the temperature in the building.

3. In a system of the class described, steam heating means for heating a building, a controller responsive to outside atmospheric conditions, heating means for the controller, means responsive to the temperature of the controller for energizing both of said heating means, and means to prevent energization of the controller heating means until the building heating means is about to heat the building.

4. In a system of the class described, heat transfer means for heating a building, means for supplying heat to the heat transfer means, outdoor thermostatic means, means for supplying heat to the outdoor thermostatic means, said outdoor thermostatic means controlling both of the heat supplying means, and means for preventing the supplying of heat to the outdoor thermostatic means until heat is supplied to the heat transfer means.

5. In a system of the class described, heat transfer means for heating a building, means for supplying heat to the heat transfer means, outdoor thermostatic means, means for supplying heat to the outdoor thermostatic means, said outdoor thermostatic means controlling both of the heat supplying means, means for preventing the supplying of heat to the outdoor thermostatic means until heat is supplied to the heat transfer means, and means for maintaining a predetermined minimum amount of heat in the heat supplying means for the heat transfer means.

6. In a system of the class described, heat transfer means for heating a building, a boiler for supplying steam to the heat transfer means, means for heating the boiler, an outdoor controller including heating means and thermostatic means, the thermostatic means controlling the operation of both heating means, and means to prevent operation of the heating means for the controller until steam is supplied to the heat transfer means.

7. In a system of the class described, heat transfer means for heating a building, a boiler for supplying steam to the heat transfer means, means for heating the boiler, an outdoor controller including heating means and thermostatic means, the thermostatic means controlling the operation of both heating means, means to prevent operation of the heating means for the controller until steam is supplied to the heat transfer means, and means to maintain a predetermined minimum condition in the boiler.

8. In a system of the class described, heat transfer means for heating a building, a boiler for supplying steam to the heat transfer means, means for heating the boiler, an outdoor controller including heating means and thermostatic means, the thermostatic means controlling the operation of both heating means, means to prevent operation of the heating means for the controller until steam is supplied to the heat transfer means, and means to maintain a predetermined minimum temperature in the boiler.

9. In a system of the class described, heat transfer means for heating a building, a boiler for supplying steam to the heat transfer means, means for heating the boiler, an outdoor controller including heating means and thermostatic means, the thermostatic means controlling the operation of both heating means, means to prevent operation of the heating means for the controller until steam is supplied to the heat transfer means, and means to maintain the condition of the boiler between a predetermined minimum temperature condition and a predetermined maximum pressure condition.

10. In combination with a heating system for a building including heat transfer means, a boiler for supplying steam to the heat transfer means and means for heating the boiler, of an outdoor controller including heating means and thermostatic means, the thermostatic means controlling the operation of both heating means, and means responsive to the condition of the heating system to prevent operation of the controller heating means until steam is delivered to the heat transfer means.

11. In combination with a heating system for a building including heat transfer means, a boiler for supplying steam to the heat transfer means and electrically controlled means for heating the boiler, of an outdoor controller including electric heating means and a thermostatic switch, the heating means for the boiler and the controller being connected in parallel and controlled by the thermostatic means, and switching means in series with the controller heating means to prevent operation of the controller heating means until steam is supplied to the heat transfer means.

12. In combination with a heating system for a building including heat transfer means, a boiler for supplying steam to the heat transfer means and electrically controlled means for heating the boiler, of an outdoor controller including electric heating means and a thermostatic switch, the heating means for the boiler and the controller being connected in parallel and controlled by the thermostatic means, switching means in series with the controller heating means to prevent operation of the controller heating means until steam is supplied to the heat transfer means, and switching means in series with the boiler heating means to prevent operation of the boiler heating means in case the condition of the boiler becomes abnormal.

13. In combination with a heating system for a building including heat transfer means, a boiler for supplying steam to the heat transfer means and electrically controlled means for heating the boiler, of an outdoor controller including electric heating means and a thermostatic switch, the heating means for the boiler and the controller being connected in parallel and controlled by the thermostatic means, switching means in series with the controller heating means to prevent operation of the controller heating means until steam is supplied to the heat transfer means, and switching means in parallel with the boiler heating means to maintain the condition of the boiler at a predetermined minimum.

DANIEL G. TAYLOR.